(12) United States Patent
Lourenco et al.

(10) Patent No.: US 9,132,415 B2
(45) Date of Patent: *Sep. 15, 2015

(54) METHOD TO UPGRADE HEAVY OIL IN A TEMPERATURE GRADIENT REACTOR (TGR)

(75) Inventors: Jose Lourenco, Edmonton (CA); MacKenzie Millar, Edmonton (CA)

(73) Assignees: 1304338 Alberta Ltd., Edmonton (CA); 1304342 Alberta Ltd., Edmonton (CA)

( * ) Notice: Subject to any disclaimer, the term of this patent is extended or adjusted under 35 U.S.C. 154(b) by 671 days.

This patent is subject to a terminal disclaimer.

(21) Appl. No.: 13/499,656

(22) PCT Filed: Jun. 30, 2011

(86) PCT No.: PCT/CA2011/050403
§ 371 (c)(1),
(2), (4) Date: May 7, 2012

(87) PCT Pub. No.: WO2012/000115
PCT Pub. Date: Jan. 5, 2012

(65) Prior Publication Data
US 2013/0001064 A1  Jan. 3, 2013

Related U.S. Application Data

(60) Provisional application No. 61/360,334, filed on Jun. 30, 2010, provisional application No. 61/368,677, filed on Jul. 29, 2010.

(51) Int. Cl.
*C10B 55/10* (2006.01)
*C10G 47/22* (2006.01)
(Continued)

(52) U.S. Cl.
CPC . *B01J 21/20* (2013.01); *B01D 3/14* (2013.01); *C01B 3/10* (2013.01); *C10B 55/10* (2013.01);
(Continued)

(58) Field of Classification Search
CPC ...... C10B 55/10; C10B 57/045; C10G 47/22; C10G 47/30; C10G 47/36; C10G 2300/4006; C10G 2300/708; C10G 2300/807; C01B 3/10; B01D 3/14

USPC ............. 201/30, 31, 34, 38; 203/14, 93; 208/107, 126, 127, 264; 423/657
See application file for complete search history.

(56) References Cited

U.S. PATENT DOCUMENTS 2,446,925 A * 8/1948 Hemminger ............... 208/74
2,495,613 A * 1/1950 Tuttle ........................ 208/126
(Continued)

FOREIGN PATENT DOCUMENTS

CA 1098852 A 4/1981
CA 2 515 999 A1 10/2004
(Continued)

OTHER PUBLICATIONS

International Search Report mailed Oct. 31, 2011, issued in corresponding International Application No. PCT/CA2011/050403, filed Jun. 30, 2011, 3 pages.

*Primary Examiner* — In Suk Bullock
*Assistant Examiner* — Jonathan Miller
(74) *Attorney, Agent, or Firm* — Christensen O'Connor Johnson Kindness PLLC (57) ABSTRACT

A method of upgrading heavy oil in which the heavy oil is preheated to above a boiling point of water to remove water as steam and lighter fractions as vapors. The heavy oil passes downwardly through a series of sequential horizontal heat gradients in a temperature gradient reactor. A temperature of each sequential heat gradient progressively increases so that lighter fractions of the heavy oil vaporize with minimal cracking and heavier heavy oil fractions continue to fall by force of gravity downwards. As they pass through further sequential heat gradients of progressively increasing temperature, they tend to crack into lighter fractions in the presence of nascent hydrogen. Coke, formed from heavier heavy oil fractions generated and deposited on a fluidized catalytic bed a bottom of the temperature gradient reactor, is fluidized with superheated steam. The superheated steam generates the nascent hydrogen required to promote hydrogen reactions by indirect heated steam reforming and water-gas shift reactions.

15 Claims, 5 Drawing Sheets

(51) Int. Cl.
*B01J 21/20* (2006.01)
*C10B 57/04* (2006.01)
*B01D 3/14* (2006.01)
*C01B 3/10* (2006.01)
*C10G 31/06* (2006.01)
*C10G 47/36* (2006.01)
*C10G 69/04* (2006.01)

(52) U.S. Cl.
CPC ............. *C10B 57/045* (2013.01); *C10G 31/06* (2013.01); *C10G 47/22* (2013.01); *C10G 47/36* (2013.01); *C10G 69/04* (2013.01); *C10G 2300/4006* (2013.01); *C10G 2300/708* (2013.01); *C10G 2300/807* (2013.01)

(56) References Cited

U.S. PATENT DOCUMENTS

| | | | |
|---|---|---|---|
| 4,094,767 A | | 6/1978 | Gifford, II |
| 4,187,672 A | * | 2/1980 | Rasor .......................... 60/39.12 |
| 4,213,826 A | * | 7/1980 | Eddinger et al. ................ 201/31 |
| 4,265,736 A | * | 5/1981 | Thayer .......................... 208/353 |
| 4,306,961 A | | 12/1981 | Taciuk |
| 4,323,446 A | * | 4/1982 | Chervenak et al. ........... 208/410 |
| 4,404,086 A | | 9/1983 | Oltrogge |
| 4,459,201 A | | 7/1984 | Eakman |
| 4,561,966 A | | 12/1985 | Owen |
| 5,536,488 A | * | 7/1996 | Mansour et al. ............... 423/652 |
| 7,550,063 B2 | * | 6/2009 | Gawad .......................... 202/241 |
| 2011/0094940 A1 | | 4/2011 | Weisselberg |
| 2011/0206571 A1 | | 8/2011 | Skinner |

FOREIGN PATENT DOCUMENTS

| | | |
|---|---|---|
| GB | 977905 | 12/1964 |
| JP | 2006104261 A | 4/2006 |
| WO | 2010115283 A1 | 10/2010 |
| WO | 2012000115 A1 | 1/2012 |

* cited by examiner

METHOD TO UPGRADE HEAVY OIL IN A TEMPERATURE GRADIENT REACTOR (TGR)

FIELD

There is described a method of upgrading heavy oils, providing a high heat and mass transfer rates in a controlled temperature gradient reactor to generate higher yields of light condensable hydrocarbons.

BACKGROUND

The properties of heavy oils and bitumen have long been known, in general, they have a low API gravity, high asphaltene content, low middle distillate yield, high sulphur content, high nitrogen content and high metal content. A typical Athabasca bitumen may contain 51.5 wt % material boiling above 524 C, 4.48 wt % sulphur, 0.43 wt % nitrogen, 213 ppm vanadium and 67 ppm nickel. These heavy oils are very viscous, they require enhanced oil recovery techniques such as steam injection and, as a result stable oil/water emulsions are formed. The first process in oil production is the breakup of these emulsions to meet pipeline specs. Generally the water is removed by a combination of gravity separation and addition of demulsifiers to break the emulsion, these are often difficult and costly chemical and mechanical treatments. After, a water free oil has been obtained, the viscosity and density pipeline specifications are met by the addition of a diluent. The heavy oil is now ready for transport to be processed. Among the prior art broad categories of heavy oil upgrading processes already known are: carbon rejection, hydrogen addition and gasification. Carbon rejection processes include: delayed coking, fluid coking, and other versions of heavy oil cracking. Hydrogen addition processes include: hydrocracking and hydrotreating. Gasification processes include; direct and indirect combustion.

In the carbon rejection process, heavy oil is converted to distillates and coke, they typically remove more than 20% of the feed material as coke, this represents an excessive waste of resources. In hydrogen addition processes, and in the presence of catalysts an external source of hydrogen (typically generated from natural gas) is added to increase the hydrogen to carbon ratio, reduce sulphur and nitrogen content, and prevent the formation of coke. Examples of hydrogen addition processes include: fixed bed catalytic hydroconversion; ebullated catalytic bed hydroconversion and thermal slurry hydroconversion. These processes differ from each from: operating conditions, liquid yields, catalysts compositions, reactor designs, heat transfer, mass transfer, etc., the objective being to decrease the molecular weight of large fractions to produce lighter fractions and remove sulphur and nitrogen. In gasification processes, the objective is to convert the heavy fractions into lighter fractions using a heat carrier, there are two methods; direct and indirect. Examples of direct and indirect gasification processes for heavy oil operations are; the heavy to light HTL process an indirect process which has two vessels; a gasifier and a combustor, sand is re-circulated between the gasifier and the combustor as the heat transferring medium and the OrCrude Upgrading a direct process where the heavy fractions are converted into syngas on a contact gasifier.

Of all the above processes the most common in the industry are the carbon rejection and hydrogen addition processes. In carbon rejection, delayed coking is the preferred process. The hydrogen addition processes are continuously improving from ebbulated to slurry with the development of new catalysts. The gasification processes are relatively new in the heavy oil industry and not yet established as a process of choice. The delayed coking process is an established process that produces unstable distillate products, they require stabilization via hydrotreating, moreover it has lower liquid yields due to the high generation of coke, typically over 20% of the feed material. The hydrogen addition processes, typically require a steam reformer plant to generate high pressure hydrogen for the reaction with hydrocarbons in the presence of selective catalysts. These processes typically operate at high pressures and temperatures, generating liquid yields in excess of 100%. The major operation challenge in the hydrogen addition processes is the deactivation of the catalysts due to the impurities present in the feed such as; sulfur, nitrogen and metals. As the catalyst becomes deactivated it must be removed and regenerated, catalyst regeneration is usually done offsite by catalysts manufacturers.

SUMMARY

There is provided a method of upgrading heavy oil. The heavy oil is first preheated up to 350 C to remove water as steam and the lighter fractions as vapours. The heavy oil passes downwardly through a series of sequential horizontal heat gradients in a temperature gradient reactor. A temperature of each sequential heat gradient progressively increases so that lighter fractions of the heavy oil vaporize with minimal cracking and heavier heavy oil fractions continue to fall by force of gravity downwards. As they pass through further sequential heat gradients of progressively increasing temperature, they tend to crack into lighter fractions in the presence of nascent hydrogen. Coke, formed from heavier heavy oil fractions generated and deposited on a fluidized catalytic bed a bottom of the temperature gradient reactor, is fluidized with superheated steam. The superheated steam generates the nascent hydrogen required to promote hydrogen reactions by indirect heated steam reforming and water-gas shift reactions. The organo-metals in the heavy oil serve as a catalyst that is activated by the superheated steam to promote cracking and hydrogen reactions. The lighter fractions of heavy oil which are vaporized are captured.

The present invention eliminates the current practice of chemical and mechanical processes to treat emulsified heavy oil at production oil batteries. Moreover, it upgrades heavy oil to meet viscosity and density pipeline specifications, eliminating the practice of adding diluents to meet these specifications. Furthermore the process has the ability to generate in-situ nascent hydrogen to meet any desired hydrogen volume requirements, this capability eliminates the need for natural gas steam reforming plants. The process also has the ability to generate its own catalyst by concentrating and accumulating the organo metals present in the feed material to the reactor, coke is produced and deposited on the catalyst under controlled conditions to provide the carbon source required for the generation of hydrogen. The controlled production and consumption of coke for the in-situ generation of nascent hydrogen provides a secondary benefit as it regenerates the catalyst ensuring a constant catalytic activity. The continuous addition of organo metals (fresh catalyst) is provided in the feed material.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Overview

The heavy oil is first heated to a temperature up to 350 C and discharged into a low pressure vessel for separation of two boiling point fractions, lighter fractions and heavy fractions. The heavy fractions are fed into the TGR reactor operating at pressures between 0.1 and 5 MPa. The temperature gradient in the reactor is controlled between 350 and 1000 C to meet desired product specifications. The cooling required to generate the temperature gradient is supplied by steam generation coils oriented at the top and middle sections of the TGR reactor. The heat required to maintain the TGR reactor operating temperature is supplied by pulse heat combustor exchangers immersed in the catalytic fluidized bed at the bottom section of the TGR reactor. The pulse heat combustor exchangers consist of bundles of pulsed heater resonance tubes. The gas supply required for the pulse heaters is provided by the acid fuel gas generated in the process, making the TGR reactor energy sufficient, operating on its own fuel. Simultaneously, the high temperature generated in the pulse combustor converts the $H_2S$ into elemental sulfur and hydrogen. Pulsations in the resonance tubes produce a gas side heat transfer coefficient which is several times greater than conventional fired-tube heaters.

Steam reformation is a specific chemical reaction whereby steam reacts with organic carbon to yield carbon monoxide and hydrogen. In the TGR reactor bottom section the main reaction is endothermic as follows: $H_2O+C+heat=H_2+CO$, steam also reacts with carbon monoxide to produce carbon dioxide and more hydrogen through the water gas shift reaction: $CO+H_2O=H_2+CO_2$. The TGR reactor fluidized bed startup material can be spent catalysts or a bi-functional catalyst mixture of clays and sand. As the heavy fractions enter the TGR reactor and travel down the reactor, flashing and crackings occurs where volatile components are released and the resulting coking gravitates to the bottom of the reactor where it undergoes steam reforming to produce hydrogen. The organo-metals such as nickel and vanadium promote catalytic hydrogenation activity to produce $H_2S$ and lighter fractions.

The TGR reactor bottom section contains a large mass of catalytic media which provides a large thermal storage for the process. This attribute makes it insensitive to fluctuations in feed rate allowing for very high turn down ratios. The endothermic heat load for the steam reforming reaction is relatively large and the ability to deliver this indirectly in an efficient manner lies in the localized, on-time, fast response, immersed pulse enhanced combustor heat exchangers which provide a very high heat transfer. The pulse enhanced combustor heat exchangers operate on the Helmholtz Resonator principle, air and acid fuel gas are introduced into the combustion chamber with air flow controlled through aero valves, and ignite with a pilot flame; combustion of the air-acid fuel gas mix causes expansion. And the hot gases rush down the resonance tubes, it leaves a vacuum in the combustion chamber and, causes the hot gases to reverse direction and flow back towards the chamber; the hot chamber breaching and compression caused by the reversing hot gases ignite the fresh air-fuel gas mix, again causing expansion, with the hot gases rushing down the resonance tubes, leaving a vacuum in the combustion chamber. This process is repeated over and over at the design frequency of 60 Hz or 60 times per second. This rapid mixing and high temperature combustion in the pulse enhanced combustor heat exchanger provide the ideal conditions for the conversion of the $H_2S$ in the acid fuel gas stream to $H_2$ and $S_2$ for the recovery of sulphur and generation of hydrogen. Only the tube bundle portion of the pulse enhanced combustor heat exchanger is exposed to the TGR reactor. Because the bundles are fully submerged in a fluid bed, the heat transfer on the outside of the tubes is very high. The resistance to heat transfer is on the inside of the tubes. However, since the hot flue gases are constantly changing direction (60 times per second), the boundary layer on the inside of the tube is continuously scrubbed away, leading to a significantly higher inside tube heat transfer coefficient as compared to a conventional fire-tube. The heavy oil fraction is rapidly cracked and volatized in the presence of nascent hydrogen where it is desulfurized and converted into lighter fractions. The presence of steam generation coils in the reactor provide a means to control the temperature zones in the reactor and form a temperature gradient, the selected operating temperature gradient defines the desired product specification. The produced acid fuel gas provides the fuel for the pulse enhanced combustor heat exchangers. The heat generated by the pulse enhanced combustors provides the thermal energy required to; generate hydrogen in-situ, crack the heavy fractions into lighter fractions, convert the generated $H_2S$ in the acid fuel gas to elemental sulfur and hydrogen, produce steam and produce a catalyst from the organo-metals in the heavy oil feed.

Figure 1:
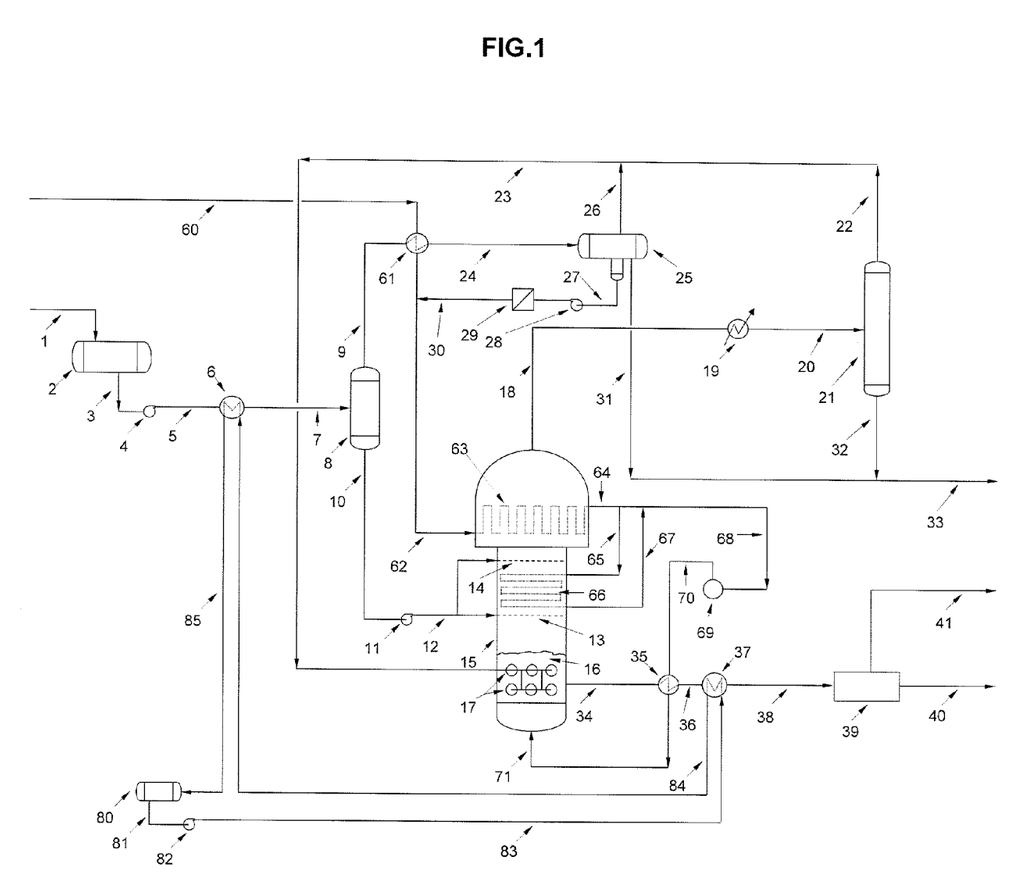
FIG. 1 is a flow diagram illustrating a method for processing heavy oil by pre-heating and separating the heavy oil into light and heavy fractions in a temperature gradient reactor.

Operation:

The method will now be described with reference to FIG. 1. The proposed invention provides a process to upgrade a wide range of heavy oil streams with or without oil/water emulsions. The feed material is fed through line 1 into feed drum 2. The feed enters oil feed pump 4 through line 3 where it is pressurized and then pre-heated in heat exchanger 6 to temperatures up to 350 C and, enters separator 8 through line 7. The lower boiling point fractions exit vessel 8 through line 9, and condensed in heat exchanger 61, the condensate enters overhead separator 25 where it separates into three streams. A fuel gas stream 26 discharges into fuel gas header 23. The product stream 31 discharges into product header 33 for storage. The water stream 27 leaves the boot of the overhead separator 25 and is fed to water pump 28, pressurized through membrane 29, and discharged into boiler feed water header 62. The higher boiling point fraction stream 10 feeds pump 11 where the feed is pressurized and transported by stream 12 into feed distributors 13 and 14. The upper feed distributor 14 and lower feed distributor 13 provide operations with the flexibility to process various feed qualities to meet operations cracking and hydrogenation reactions requirements. The feed to distributor 13 enters the TGR reactor 15 above the fluidized bed where it is rapidly volatilized and mixed with nascent hydrogen for hydrogenation reactions, as it rises through the TGR the product vapors are cooled by steam generation high temperature coil 66 and low temperature coil 63 to stop the cracking reactions at selected controlled temperatures to meet desired product specifications. The cooling temperature to meet a desired temperature gradient in the reactor is provided by controlling the boiler feed water flow rate through steam generating high temperature coil 66 and low temperature coil 63. The feed to distributor 14 enters the TGR reactor 15 above steam generation high temperature coil 66 at a lower gradient temperature than feed to distributor 13, this upper feed distribution prevents the cracking of lower boiling point components, allowing these to vaporize with minimum cracking and the heavier components to gravitate downwards to higher temperatures where they will crack into lighter fractions in the presence of nascent hydrogen for hydrogenation reactions. The high boiling point fractions not vaporized above the fluidized catalytic bed 16 gravitate downwards to the top of the bed where it contacts the hot catalyst and rapid volatilization occurs. The coke generated and deposited in the hot catalytic bed particles fluidized by a superheated steam stream 71 is vigorously mixed by a radiated acoustic pressure from the resonance tubes of the immersed pulse burner. The catalyst present in the bed activates the superheated steam which reacts with the carbon to generate nascent hydrogen. The volume of nascent hydrogen generated is controlled by the amount of coke produced. The amount of coke produced is controlled by controlling the TGR severity mode of operation. The fluidized catalytic bed level 16 is controlled by the removal of catalyst. The continuous addition of catalyst is provided by the incoming concentration of organo-metals in the feed material. The product vapors essentially contain all the sulfur and nitrogen content in the feed material in the form of $H_2S$ ammonia; it exits the TGR reactor 15 through line 18 and is cooled in heat exchanger 19. The condensable stream 20 enters separator 21 to produce two streams, a gaseous and a liquid stream. The liquid stream 32 joins product header 33 for storage. The gaseous stream 22 is an acid gas stream that discharges into fuel gas header 23. The acid fuel gas enters the pulse combustors 17. The pulse combustors have aerodynamic valves for self regulation of the fuel to air ratio within the combustors firing range and produces heat at about 4,000,000 Btu/hr/ft3, combustion product gas temperature of about 1650 C, gas velocity in the resonance tube of at least 300 ft/sec with oscillations of about 165 dB, radiating an acoustic pressure in the catalytic bed of 140-165 dB. As a result of this intense acoustic field, a vigorous mixing between the catalytic bed particles and the reactants result in rapid rates of reaction. The high temperature of combustion achieved in the pulse combustor permits the conversion of $H_2S$ into elemental sulfur and $H_2$ rather than the conventional $SO_2$. The pulse combustors 17 are immersed in the catalytic bed 16 and provide an immediate response to the reactor temperature set point demand. The acoustic pressure delivered by the pulse combustor resonance tubes provide a vigorous mixing within the catalytic bed 16 and a superior heat and mass transfer. The products of combustion exit the pulse combustors 17 through line 34 and into heat exchanger 35. It exits through line 36 into hot oil heat exchanger 37 where it is cooled before entering the sulfur recovery unit 39 through line 38. Sulfur is recovered and sent to storage through line 40 and the products of combustion exit to a flue gas stack through line 41. A boiler feed water stream 60 is pre-heated at exchanger 61 by the overhead gases of stream 9, and exits through line 62. Water recovered from stream 9 is carried by line 24 to overhead separator 25 and then is treated in membrane 29 and added to stream 62 through line 30. The boiler feed water stream 62 enters low temperature coil 63 to control the top section temperature in the TGR reactor and exits through line 64. Boiler feed water stream 65 enters steam generation high temperature coil 66 to control the temperature in the middle section of the TGR reactor. The steam exits high temperature coil 66 through line 67 into common header 68 and discharged into steam drum 69. The saturated steam exits through line 70 and is superheated in heat exchanger 35. The superheated steam exits through line 71 and is fed into a steam distributor at the bottom section of the TGR reactor 15 to be steam reformed into nascent hydrogen. A main feature of the TGR reactor 15 is its ability to generate on demand all the hydrogen required for hydrogenation reactions, it has the ability to generate and supply the two main reactants required to produce hydrogen, steam and coke. Moreover, it can easily meet the temperature requirements by catalytic bed 16 to support the endothermic reactions required to produce hydrogen. The temperature requirements for pre-heating the feed material in heat exchanger 6 is provided by a synthetic hot oil loop with a temperature up to 350 C. A synthetic thermal oil is stored in drum 80 and fed through line 81 into oil circulating pump 82. The cooler oil stream 83 enters heat exchanger 37. It recovers heat from stream 36 and circulates it through line 84 to heat exchanger 6 to pre-heat the feed material 5. The cooler oil stream 85 returns the oil to drum 80 for recirculation.

Figure 2:
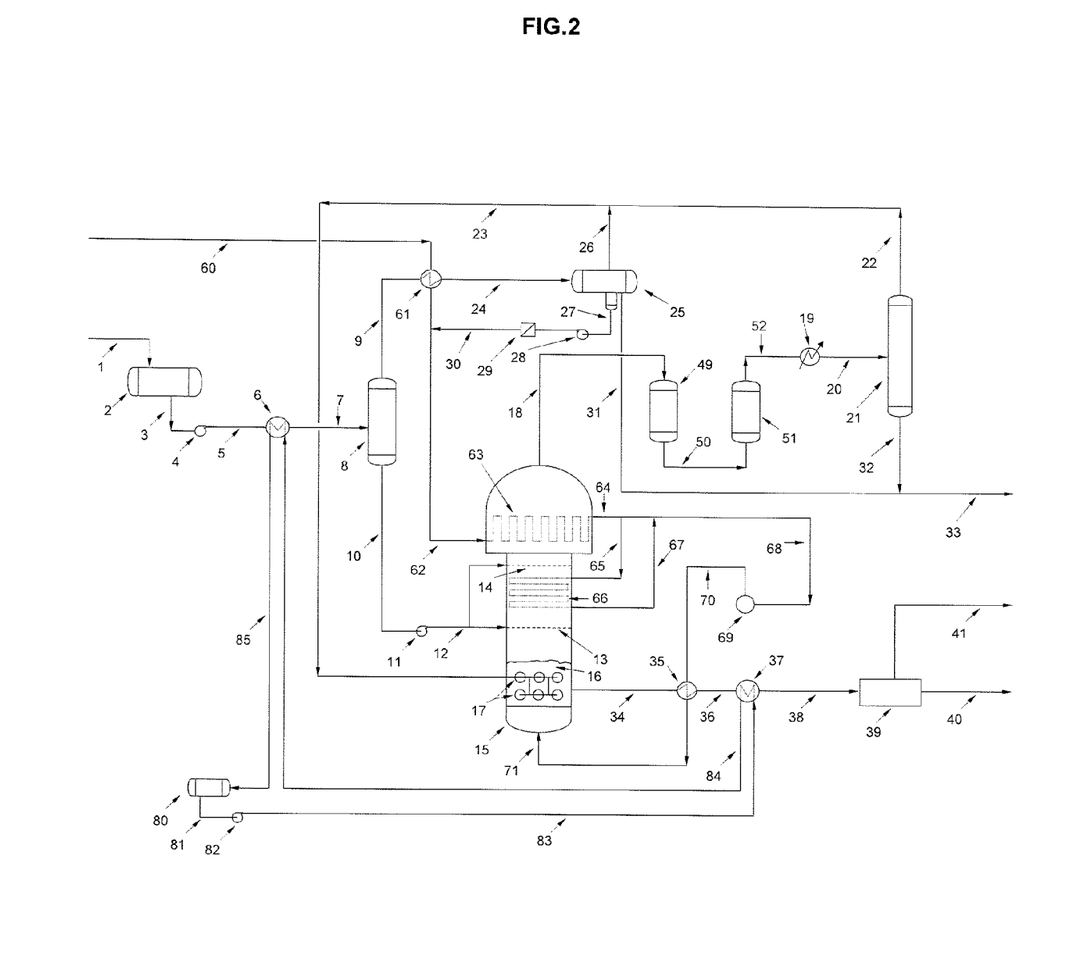
FIG. 2 is a flow diagram illustrating an optional method for the post treatment of the TGR reactor products.

Referring to FIG. 2, provides an option to post treat the gaseous products in a catalytic bed to stabilize the product through mild hydrotreating in catalytic reactors 49 and 51 using selected catalysts. Catalytic reactors 49 and 51 are connected by line 50. In this mode of operation the TGR reactor operation pressures will be between 1 and 5 Mpa. The post treatment of the TGR reactor products allows the process to meet higher product specifications. The post treatment process is a very mild operation since the typical precursors to catalytic poisoning, e.g., coke and metals, are processed upstream in the TGR reactor. After hydrotreating in catalytic reactors 49 and 51, the gaseous product enters line 52 to heat exchanger 19 as described above.

Figure 3:
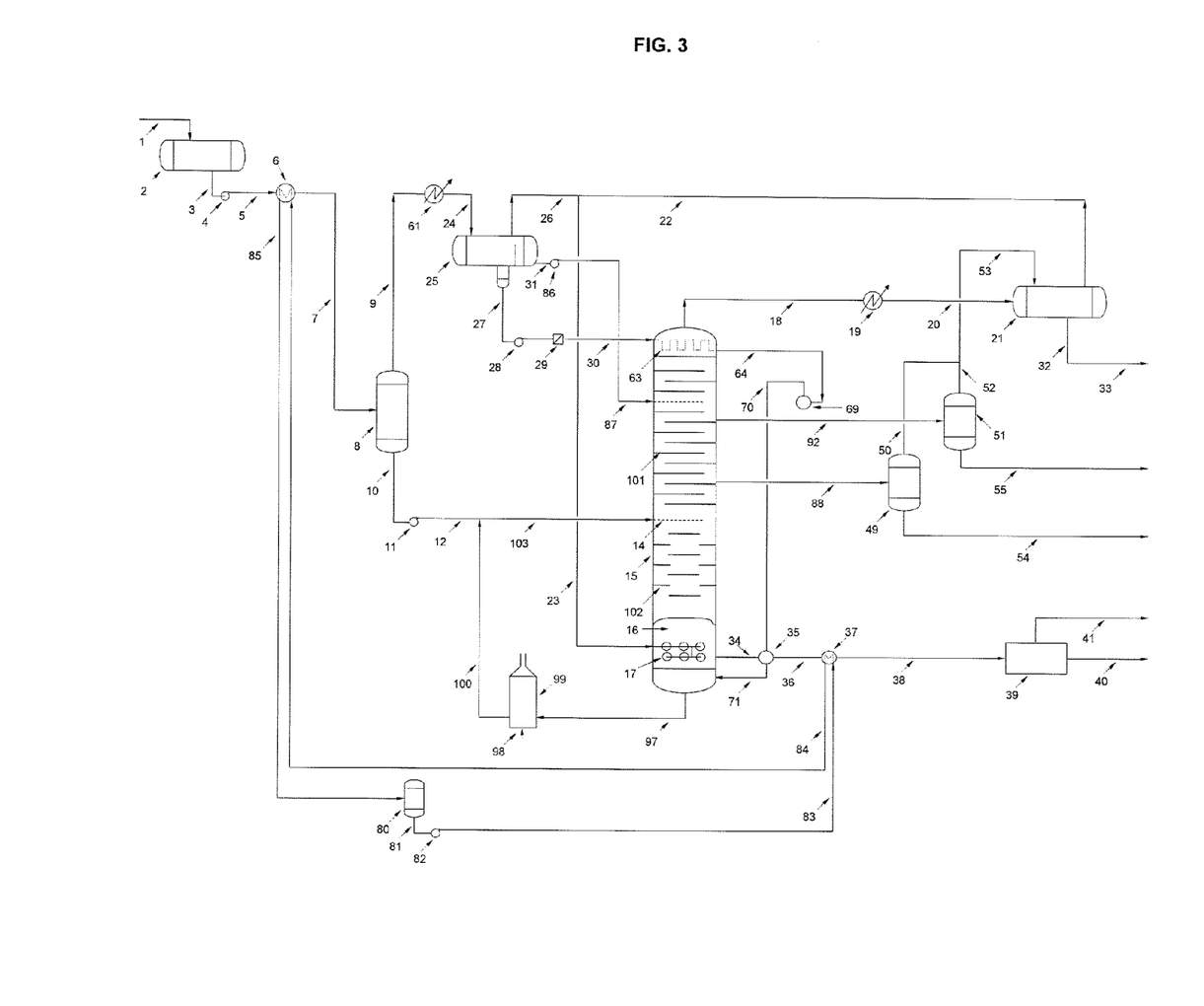
FIG. 3 is a flow diagram illustrating an optional method for the treatment and distillation of TGR reactor products in the reactor with a recycling catalyst stream.

Referring to FIG. 3, provides for the operation of a combined process of distillation, hydrotreating, hydrocracking and gasification. Distillation trays 101 are provided for fractionation. A reflux stream 87 is provided by passing product stream 31 through pump 86 to condense reactor vapors and control the upper section temperature gradient. Side stream products lines 88 and 92 remove the fractions with endpoint temperatures of 320 C and 270 C respectively. A circulating stream of catalyst stream 100 is dispersed in feed stream 12, the mixture of feed and catalyst stream 103 enters reactor 15 through distributor 14 into contact trays 102 the feed is cracked and stabilized in the presence of hydrogen generated in catalytic bed 16. The catalyst is continuously removed through line 97 and regenerated in regenerator 99 using line 98; the regenerated catalyst is recirculated through line 100 and dispersed in feed stream 12. Side stream product lines 88 and 92 may also be circulated through catalytic reactors 49 and 51 as described above. The streams from catalytic reactors 49 and 51 may be passed either to separator 21 through lines 52 and 53, or removed directly through lines 54 and 55.

Figure 4:
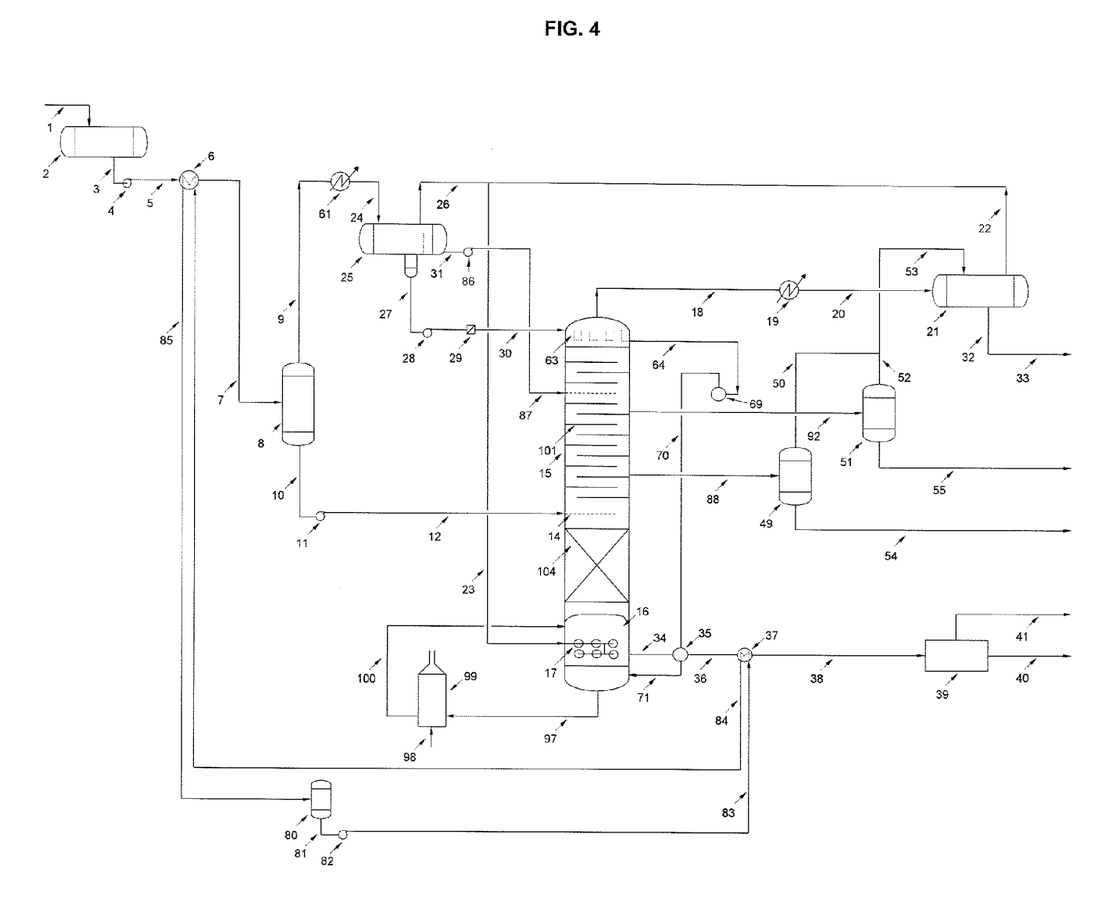
FIG. 4 is a flow diagram illustrating an optional method for the generation of insitu hydrogen with a specific catalyst, the treatment of TGR reactor products with a secondary specific catalyst and a distillation section.

Referring to FIG. 4, provides for a variation in a combined process of distillation, hydrotreating, hydrocracking and gasification. In this method, two distinct catalysts are used. Catalyst bed 16 is specific to promote the generation of hydrogen, whereas catalyst bed 104 is specific to promote the hydrogenation of cracked products. The upper part of the reactor employs fractionation trays 101 to produce three distinct streams 88, 92 and 18.

Figure 5:
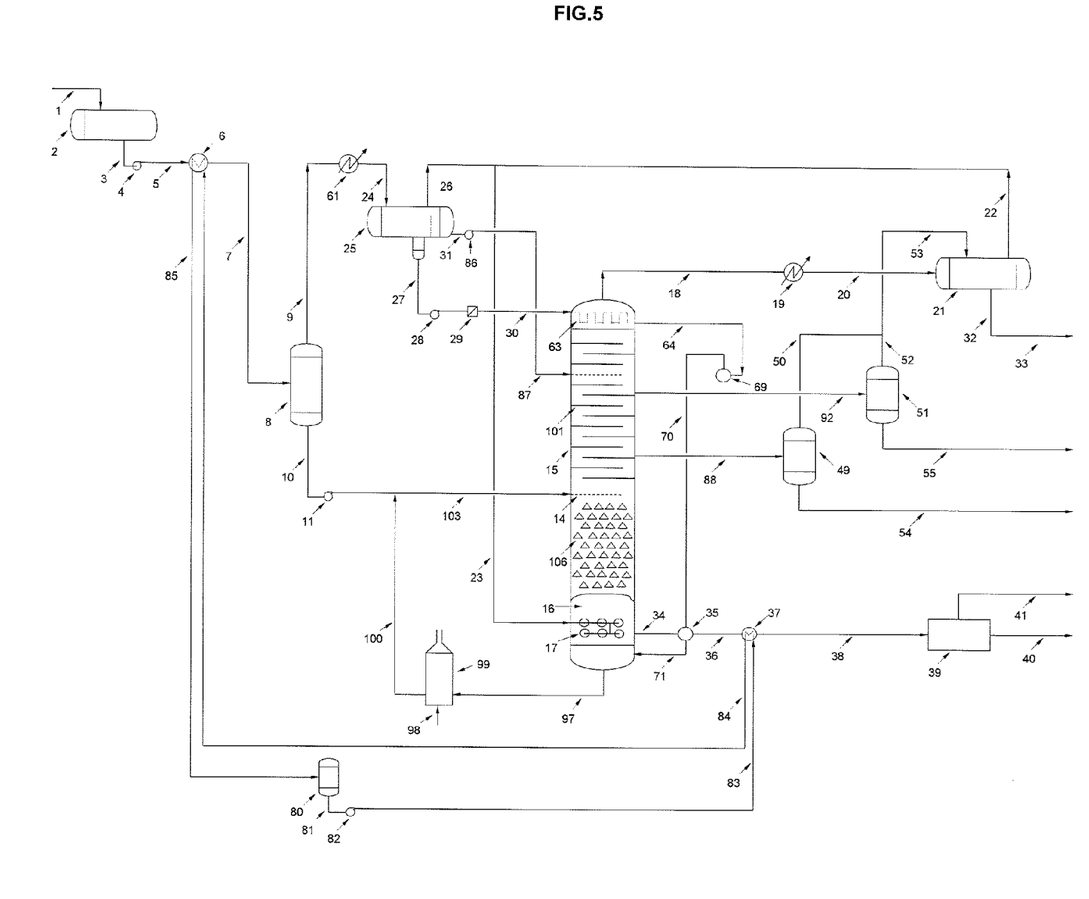
FIG. 5 is a flow diagram illustrating a variation in the internals of the TGR reactor to handle solids in the feed oil material for treatment and distillation of reactor products with a circulating catalyst.

Referring to FIG. 5, provides for a variation in a combined process of distillation, hydrotreating, hydrocracking and gasification. In this method, contact channels 106 tolerates higher concentrations of solids in the feed such as in froth oil feed streams that can contain up to 15% wt solids content, promoting hydrotreating and hydrocracking in the presence of hydrogen generated insitu in catalytic bed 16. The reference to higher concentrations of solids is intended to cover concentrations of solids in excess of five percent. There are different ways in which tolerance to solids can be increased. In the illustrated embodiment, the temperature gradient reactor has internal baffles which define angled surfaces that are angled in relation to horizontal such that solids tend to slide down the angled surfaces by force of gravity.

Advantages:

With oil-water emulsions, the water is removed without the aid of chemicals and used for steam generation. Nascent hydrogen is produced on demand to meet hydrogen requirements for desulfurization, denitrogenation and saturation of free radicals. Coke required for the steam reforming and water gas shift reactions in the production of nascent hydrogen is produced on demand at controlled temperatures to meet hydrogen requirements. A bi-functional catalyst is provided by the organo-metals in the heavy oil feed.

The current method uses the natural metal content of the oils as the catalysts, the water in the oil as a source for hydrogen and the controlled production of coke for hydrogen generation. The current method converts the heavy fractions into light fractions, and reduces sulphur and nitrogen. The current method generates in-situ hydrogen through the water gas shift reaction to desulfurize, denitrogenate and prevent polymerization producing light condensable hydrocarbons. The current method eliminates the practice of adding costly chemicals for the treatment and mechanical processing of oil/water emulsions. The current method combusts generated acid gas stream in a pulse enhanced combustor at high temperatures to promote $H_2S$ conversion to $H_2$ and $S_2$ rather than $H_2O$ and $SO_2$ thus eliminating a catalytic stage and produce additional hydrogen for upgrading. The current method uses the intense acoustic field radiated from the immersed pulse burners resonance tubes to promote vigorous mixing and heat transfer between and catalyst improving both liquid yields and the H/C ratio in the product liquids. The current method provides a high heat and mass transfer rates in a well controlled temperature gradient reactor to generate higher yields of light condensable hydrocarbons. The overall objective is to process heavy oil in a TGR reactor by generating in-situ; hydrogen, catalysts and lighter oil fractions. To desulfurize, denitrogenate and saturate the lighter oil fractions, substantially reducing the environmental impact when compared to existing practices. The process is flexible to operate raw crudes, processes residuals fractions, tank bottoms and slop oil streams to convert heavy hydrocarbon fractions into light hydrocarbon fractions. The process is flexible to; the use of selective catalysts, in-situ catalyst regeneration at a wide range of operating conditions as shown in FIGS. 3, 4 and 5. It is the standard practice to heat the entire amount of heavy oil being processed to a uniform temperature. With the above described method the oil feed is heated and processed in an increasing temperature gradient provided by the temperature gradient reactor, with a mass of heavy oil being heated decreasing as the temperature of the temperature gradient increases. This means that only a small portion of the heavy oil is heated to the highest temperatures. This results in a more efficient mass and energy transfer process. In other applications, coke formation over time will have an adverse affect upon the process. However, coke formation is important to the above described method, as superheated steam is used to generate the nascent hydrogen required to promote cracking by indirect heated steam reforming and water-gas shift reactions.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. A method of upgrading heavy oil, comprising:

preheating the heavy oil to above a boiling point and below a cracking temperature to remove a water stream as steam and a first fraction comprising a first set of lighter hydrocarbons as vapours;

passing the heavy oil downwardly through a series of sequential horizontal heat gradients in a temperature gradient reactor, with a temperature of each sequential heat gradient progressively increasing so that a second fraction comprising a second set of lighter hydrocarbons of the heavy oil vaporizes and a third fraction comprising a set of heavier heavy oil hydrocarbons continues to fall by force of gravity downwards where, as the third fraction passes through further sequential heat gradients of progressively increasing temperature, at least a portion of the third fraction cracks into a fourth fraction comprising a third set of lighter hydrocarbons in the presence of nascent hydrogen;

fluidizing a coke bed with superheated steam, the coke bed being formed from a portion of the third fraction and deposited on a fluidized catalytic bed positioned at a bottom of the temperature gradient reactor, the superheated steam generating the nascent hydrogen by indirect heated steam reforming and water-gas shift reactions, the third fraction further comprising organo-metals, wherein the organo-metals catalyse a cracking and a hydrogenation of the heavier heavy oil fractions in the presence of the nascent hydrogen; and capturing the first, second and fourth fractions of the heavy oil which are vaporized.

2. The method of claim 1, wherein the step of preheating the heavy oil comprises heating the heavy oil to a temperature of less than 350 degrees Celsius.

3. The method of claim 1, wherein the step of preheating of the heavy oil is performed by passing the heavy oil through a heat exchanger.

4. The method of claim 1, wherein a first temperature gradient of the temperature gradient reactor is up to 350 degrees Celsius.

5. The method of claim 1, wherein the organo-metals provide a continuous addition of catalyst and the rate of generation of hydrogen is controlled by controlling temperatures in order to control coke formation in the fluidized catalytic bed.

6. The method of claim 1, wherein the sequential horizontal heat gradients in the temperature gradient reactor are provided by two or more internal cooling sources.

7. The method of claim 1 wherein the fluidized catalytic bed at the bottom of the temperature gradient reactor is concurrently heated and mixed vigorously.

8. The method of claim 1, wherein the fluidized catalytic bed at the bottom of the temperature gradient reactor is heated by a combustion unit embedded in the fluidized catalytic bed.

9. The method of claim 7, wherein the heating and mixing is performed by a radiated acoustic pressure provided by resonance tubes immersed in the fluidized catalytic bed and powered by a pulse combustor.

10. The method of claim 1, where the heavy oil is heated and processed in an increasing temperature gradient provided by the temperature gradient reactor, with a mass of heavy oil being heated decreasing as the temperature of the temperature gradient increases.

11. The method of claim 1, wherein the temperature gradient reactor comprises a series of fractionation trays and provides distillation, hydro-cracking and steam reforming functions.

12. The method of claim 1, wherein a catalyst regeneration loop is provided to draw spent catalyst from the temperature gradient reactor, regenerate the catalyst and then mix the regenerated catalyst into a feed stream entering the temperature gradient reactor.

13. The method of claim 1, wherein the temperature gradient reactor comprises two fluidized catalytic beds, one of which is primarily to promote hydro-cracking and another of which is primarily to promote hydrogen generation.

14. The method of claim 11, wherein the temperature gradient reactor comprises contact channels that can process heavy oil having solids content greater than five percent.

15. The method of claim 14, wherein the temperature gradient reactor comprises internal baffles which define angled surfaces that are angled in relation to horizontal such that solids tend to slide down the angled surfaces by force of gravity.

* * * * *